Figure 1:
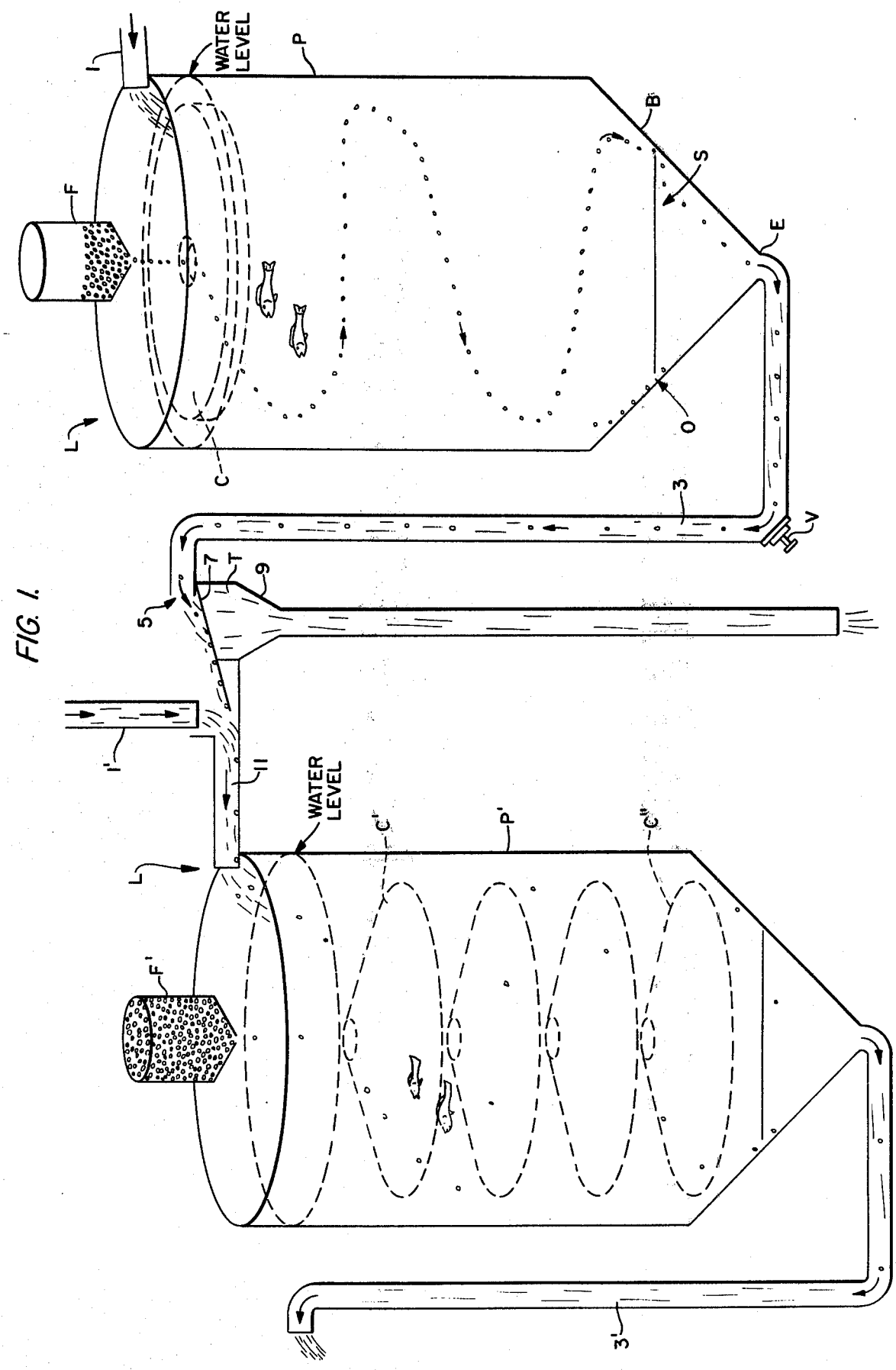

United States Patent [19]

Knowles

[11] 4,297,973
[45] Nov. 3, 1981

[54] PROCESS AND APPARATUS FOR INCREASING THE UTILIZATION OF FISH FEED IN FISH FARMING PONDS AND THE LIKE

[75] Inventor: Albert H. Knowles, Inverness, Scotland

[73] Assignee: K.R. Associates, Inc., Concord, New Hampshire

[21] Appl. No.: 141,771

[22] Filed: Apr. 21, 1980

[51] Int. Cl.³ .................. A01K 61/02; A01K 63/00
[52] U.S. Cl. ................................................ 119/3
[58] Field of Search ................. 119/3, 2, 4, 51 R; 209/932

[56] References Cited

U.S. PATENT DOCUMENTS

| | | | |
|---|---|---|---|
| 3,122,126 | 2/1964 | Yamada | 119/3 |
| 3,638,616 | 2/1972 | Carmouche | 119/3 X |
| 4,237,820 | 12/1980 | Müller | 119/3 X |

*Primary Examiner*—Hugh R. Chamblee
*Attorney, Agent, or Firm*—Rines and Rines, Shapiro and Shapiro2n

[57] ABSTRACT

This disclosure is concerned with the more efficient utilization of fish feed, such as the pelletized feed for salmonoids and the like, introduced into pluralities of ponds, through appropriate bottom funneling of uneaten feed and waste water and utilization of the exiting waste water to carry the uneaten feed for injection into a next pool after separation from the carrying waste water; the process being applicable to any type of pond, but particularly suitable for ponds in which dark rest areas are provided for accelerated growth.

30 Claims, 3 Drawing Figures

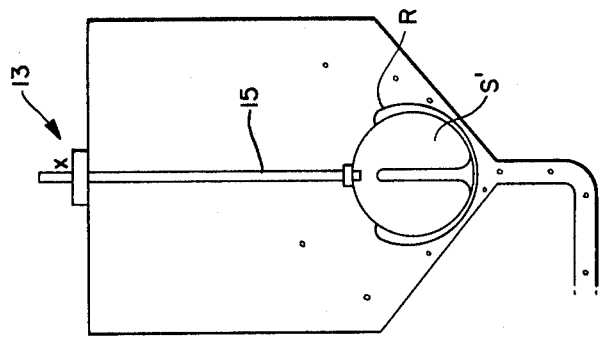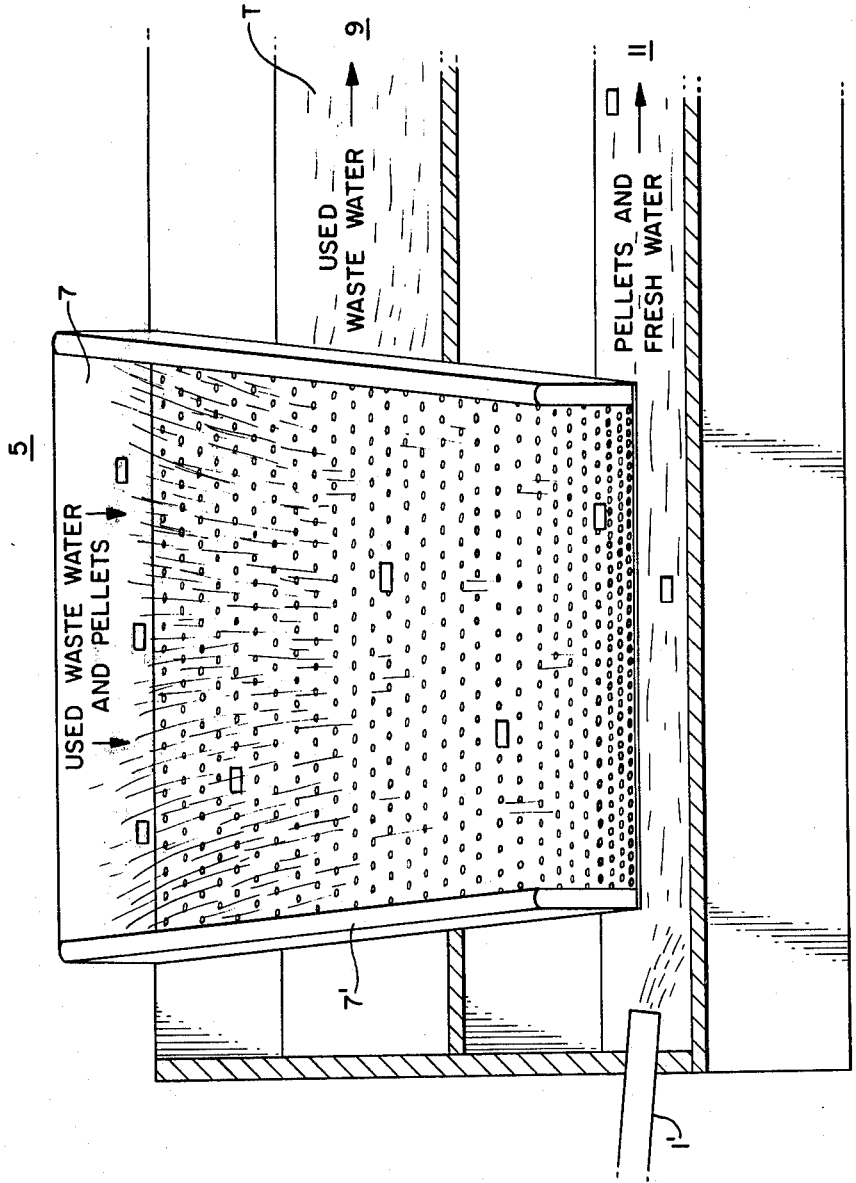

PROCESS AND APPARATUS FOR INCREASING THE UTILIZATION OF FISH FEED IN FISH FARMING PONDS AND THE LIKE

The present invention relates to processes and apparatus for increasing the utilization of fish feed in fish-farming ponds and the like, being more particularly directed to the re-use of uneaten feed exited from successive of such fish-farming pools or ponds in adjacent ponds. The term "pond" is used herein generically to describe any suitable fish-holding volume, and the term "fish" is also used in its broad sense, though the invention has particularly advantageous use in connection with salmonoids and the like.

Assuming that fish have been provided with a suitable environment, including water of an appropriate temperature range for the species, enough oxygen and space, the most important element required to achieve satisfactory growth is food.

The accepted method in fish husbandry is to feed into the pond an amount of food based on an estimate of a percentage of the fish body weight. This method is used for two main reasons. The first is the economics of the cost of feed stuffs, it being desirable to obtain the best conversion rate of flesh for food introduced into the pond. The other principal consideration is not to put more food into the pond than the fish can eat, as otherwise, in a pond which has a poor 'self-cleaning' action, the waste food will remain on the bottom of the pond, de-compose and take oxygen from the water, thus depriving the fish of the same.

Unfortunately, the method used to estimate the daily ration of food required is complex and time consuming, and at best only gives a very rough idea. Given the right conditions, a fish will put on weight very quickly, provided it does get enough food. In practice, this means having to put more food into the pond than the fish can eat in order to assure the best result, such that the process can become a vicious circle.

In accordance with the present invention, however, more food can be introduced into the pond than the fish can eat, providing all they can possibly want for maximum growth; but, by using apparatus of a novel design which passes waste food through quickly and catches and separates that food from the waste water at the outlet of the pond and guides it into the fresh water flow of another adjacent pond, where it can become available for other fish to eat, obviates the above-described problems and vastly increases feed utilization efficiency.

Most commercial farms use pelletted dry feeds having a life in water before they disintegrate of, for example, approximately thirty minutes. This gives ample time for pellets to circulate around the first pond, to be presented to all the fish in that pond, to be washed out of the outlet pipe, strained from the waste water and fed into a further pond. While some solid excreta is also strained out with the pellets, the fish naturally sort one from the other, and, because of the solid form, present no pollution problem.

In the past, it has been a practice to keep fish in a pond at the end of outlet drains of the fishfarms to make use of wasted food. This method, however, has the disadvantage that the fish are living in second-hand water from which most of the oxygen has already been used up by previous fish, resulting in usually poor growth that works against any advantage in using up waste feed. With the technique of the present invention, on the other hand, although using waste feed, the process also enables the use of continually fresh water, it being thus an object of the invention to provide a new and improved process and apparatus for increasing the utilization of fish feed in fish-farming ponds and the like, while obviating the above-described and other disadvantages of prior and current techniques.

A further object is to provide such novel improved feed utilization and efficiency that can be employed with all types of conventional pond structures and can be particularly, though not exclusively, useful with ponds employing dark rest areas or zones for the fish, associated with contiguous illuminated regions where the feed can be viewed as the fish rest in such dark areas, as described, for example, in copending United States patent applications Ser. No. 65,617, filed Aug. 10, 1979, and Ser. No. 83,571, filed Oct. 9, 1979, respectively for Process and Apparatus for Accelerating Growth Rate of Salmonoids and Other Fish and the Like, and for Fish Growth Acceleration and Density-Increasing Apparatus and Method.

Other and further objects will be explained hereinafter and will be more particularly pointed out in the appended claims.

In summary, however, from one of its broader aspects, the invention embraces a process for increasing the utilization of fish feed, that comprises, separately applying inlet water to a plurality of successive fish ponds; introducing fish feed into at least one of said ponds and circulating the same about the pond as the feed drops under gravity toward the bottom of said pond; carrying uneaten feed at the said bottom of the pond upward with the pond waste water towards the top of an adjacent pond while retaining the fish in the pond; ejecting the waste water while screening therefrom the carried uneaten feed; and imparting momentum to such feed to carry the same into the said adjacent pond to be circulated about said adjacent pond by the inlet water applied thereto.

In connection with utilization in the accelerated growth systems of said copending patent applications, the invention also contemplates use of such feed apparatus in a system where in at least one of said ponds, light is blocked to create dark rest areas for the fish while exposing illuminated regions adjacent the dark areas where the circulating and dropping feed may be viewed by the fish as they rest in the dark rest areas and selected by the fish for eating as desired. Preferred details and best mode of operation are hereinafter set forth.

The invention will now be described with reference to the accompanying drawings, FIG. 1 of which is an illustration of a pond system embodying the invention;

FIG. 2 is a front elevation, on an enlarged scale, of the sloping screen portion of the apparatus of FIG. 1; and FIG. 3 is a view similar to FIG. 1 of a modified bottom screening structure.

Referring to FIG. 1, a fish pond system comprising a plurality of adjacent ponds P and P¹ (shown for illustrative purposes as a pair, though many more successive ponds may be used in actual practice), is supplied with water that flows through the ponds as from, for example, a fresh water stream in the case of young salmonoids, such as salmon fry, parr and smolt, trout, etc. The successive ponds P and P¹ are illustrated as installed one higher than the other, so that the water level in P is higher than that in $P^1$, as later explained. In this example, the ponds are shown as of circular cross-section silo-like construction, though other configurations can also be employed.

A fresh-water inlet 1 from the before-mentioned river serves as a continual fresh source of water for pond P; and a similar inlet 1' from the same source separately feeds fresh inlet water into pond $P^1$; and so on for other ponds (not shown) if employed. By angling the inlet 1, the water will circulate around the pond P. Feed, such as the pelletized feed before mentioned, shown for illustrative purposes as periodically dropped into the central region of the pond, as from any well-known solenoid-shutter operated automatic feeder F, will thus be circulated somewhat spirally as it drops downward, under gravity, toward the bottom of the pond, as shown. In a preferred mode, the bottom walls of the pond are convergingly funnelled as at B toward the exit E, accommodating a fish-retaining member S having openings as at O between its peripheral edge and the walls B, of size sufficient to retain the fish in the pond P while permitting waste water from the pond carrying uneaten feed to exit at E.

In accordance with the present invention, an upwardly extending outlet pipe 3 is connected to the exit E of the pond P to carry the waste water and uneaten feed upwards towards the top of the adjacent pond $P^1$, ejecting the same at 5 upon a downwardly sloping perforated screen 7 beneath which a waste water outlet pipe 9 is disposed, shown with an upper trough T to accommodate a substantial portion of the screen 7. The screen perforations are smaller than the size of the waste feed particles. The waste water traveling downwardly over the surface of the screen 7 thus drops through the screen perforations into the outlet 9, the length of the screen 7 being made sufficient relative to the waste water flow rate to separate substantially all the waste water from the uneaten feed by the time such feed reaches the bottom (or left-hand) end of the screen 7. A by-pass valve V may be provided at the lower elbow of the outlet pipe 3 to by-pass waste water while the pond is being cleaned.

Sufficient momentum is imparted to the thusly separated uneaten feed from pond P to carry the same to the region where the inlet 1' of pond P' transversely injects fresh water, such that the waste feed is carried at 11 by the separate fresh water inflow into the next pond P' of lower water level, as diagramatically illustrated. The pond P' is shown constructed similarly to the pond P, with its waste outlet 3' being adapted to connect with the inlet of a next pond (not shown) in the same manner as the system 5-7-9-1'-11 connects the outlet 3 of pond P to pond P', and applies uneaten feed to the separate fresh water inlet thereof while disposing of the waste water. Main feed for pond P' is illustrated as effected by the automatic feeder F', similar to the before-described feeder F of pond P.

Details of a preferred structure for the perforated separating screen 7 are shown in the frontal view of FIG. 2, wherein the used waste water and uneaten feed pellets ejected from pipe 3 at 5, are illustrated as traveling over the screen perforations between side walls 7', such that the waste water drops into the trough portion T of the waste conduit 9, and the separated feed pellets are carried by the fresh inlet water at 1' along the inlet trough 11 into the pond P'.

While the above construction and technique underlying its operation may be used with any desired pond and of any desired geometry or configuration, it is particularly useful in ponds adapted for accelerated fish growth, such as those described in said copending applications. These involve the blocking of light from an appreciable portion of the surface of the pond to create dark rest areas for the fish, while exposing only illuminated regions adjacent the dark areas where the circulating and dropping feed may be viewed by the fish as they rest in the dark rest areas, and selected at will by the fish for eating as desired. This is illustratively shown as effectable in the pond P of FIG. 1 by a floating light-blocking cover C having a central opening aligned with the feeder F and also exposing illumination in the peripheral regions between the cover and the walls of the pond. The peripheries of both the cover opening and the outer cover edge contact and preferably extend below the water surface to insure the required darkness thereunder; and, as explained in said applications, extended illumination beyond daylight up to 24 hours, as at L, and which is restricted to the illuminated regions adjacent the dark cover areas only, produces accelerated growth without fish agitation, nibbling or feed competition, particularly adapted to make efficient use of the recovered uneaten feed salvaged in accordance with the invention. As another example, the cover may be totally submerged as is the case with the frusto-conical cover C' in the pond P'; and a plurality of vertically spaced covers may be provided as at C'-C" to define stacked rest areas at successive vertical sections of the pond P'. Combinations of these techniques may also be used, if desired.

While, moreover, a flat retainer S is shown in FIG. 1 for allowing waste water and uneaten feed to pass through peripheral spaces or openings O, while retaining the fish in the pond, a more facile modification is shown in FIG. 3. The retainer S' thereof is illustrated in the form of a sphere having external spaced partially circumferential ridges R that define the peripheral openings to the converging or funnelling bottom walls of the pond. The dimensions of the ridges may, of course, be varied to accommodate for the retention of different-sized fish. By providing a surface float 13 secured as by the illustrated vertical rod 15 to the top of the sphere, an automatic mechanism is provided for lifting the sphere S' in response to a rise in pond water level resulting from a choking by debris or otherwise at the bottom of the pond, thereby to increase the peripheral openings to relieve such choking and then to return the sphere S' to its previous location. Other constructions may also be used for this purpose.

Further modifications will also occur to those skilled in this art, and such are considered to fall within the spirit and scope of the invention as defined in the appended claims.

What is claimed is.

1. A process for increasing the utilization of fish feed, that comprises, separately applying inlet water to a plurality of successive fish ponds; introducing fish feed into at least one of said ponds and circulating the same about the pond as the feed drops under gravity toward the bottom of said pond; carrying uneaten feed at the said bottom of the pond upward with the pond waste water towards the top of an adjacent pond while retaining the fish in the pond; ejecting the waste water while screening therefrom the carried uneaten feed; and imparting momentum to such feed to carry the same into the said adjacent pond to be circulated about said adjacent pond by the inlet water applied thereto.

2. A process as claimed in claim 1 and in which additional fish feed is also periodically introduced into said adjacent pond and circulated with the uneaten feed introduced from the said one pond.

3. A process as claimed in claim 2 and in which the feed remaining uneaten near the bottom of said adjacent pond is similarly carried with the waste water of said adjacent pond upwards to the top of a next pond and screened therefrom and introduced into the inlet water applied to said next pond.

4. A process as claimed in claim 1 and in which said one pond is located somewhat higher than the adjacent pond so that the region of ejecting of the waste water from said one pond is above the water level in the adjacent pond.

5. A process as claimed in claim 1 and in which said ejecting of the waste water from said one pond and screening therefrom of the uneaten feed is effected by flowing the waste water over a downwardly inclined screen covering a waste water outlet and directed to merge with the inlet water applied to said adjacent pond.

6. A process as claimed in claim 1 and in which the waste water and uneaten feed near the said bottom of the said one pond is convergingly funneled before being carried upward.

7. A process as claimed in claim 1 and in which in at least one of said ponds light is blocked to create dark rest areas for the fish while exposing illuminated regions adjacent the dark areas where the circulating and dropping feed may be viewed by the fish as they rest in the dark rest areas and selected by the fish for eating as desired.

8. A process as claimed in claim 7 and in which blocking of light is effected by floating light-blocking cover means with said illuminated regions adjacent portions of said cover means.

9. A process as claimed in claim 7 and in which illumination is provided for said regions beyond daylight hours.

10. A process as claimed in claim 7 and in which blocking of light is effected by submerging cover means within the pond with said illuminated regions adjacent portions of said cover means.

11. A process as claimed in claim 7 and in which said rest areas are provided by a plurality of vertically spaced cover means disposed within the pond defining stacked rest areas at successive vertical sections of the pond.

12. Fish feeding apparatus having, in combination, a plurality of successive fish ponds each having fish-feed introducing means and inlet water means for separately supplying inlet water to the respective ponds and for circulating the feed about the same as the feed drops under gravity towards the bottom of the pond; means near the bottom of at least one of the ponds for retaining fish while permitting waste water carrying uneaten feed to exit from the pond; means connected to such exit for carrying the waste water and uneaten feed upward towards the top of an adjacent pond; and means for ejecting the upwardly carried waste water while screening therefrom the uneaten feed and imparting momentum to such feed to carry the same into the inlet water supplied to said adjacent pond.

13. Fish feeding apparatus as claimed in claim 12 and in which a plurality of said ponds is provided each with said ejecting and screening means for carrying uneaten feed from one pond to the next pond of the plurality of ponds.

14. Fish feeding apparatus as claimed in claim 12 and in which said one pond is positioned so that the water level therein is higher than that of the adjacent pond, such that the region of ejecting of the waste water from said one pond is above the water level in said adjacent pond.

15. Fish feeding apparatus as claimed in claim 12 and in which said ejecting and screening means comprises a downwardly sloping screen having upwardly extending side walls and having perforations small compared with the uneaten feed and positioned to receive and pass the ejected waste water downwardly over the screen between the side walls thereof such that the waste water traveling therealong drops through the perforations of the screen while carrying the uneaten feed, the screen length being sufficient relative to the waste water flow rate to separate substantially all the waste water from the uneaten feed by the time such feed reaches the bottom of the screen.

16. Fish feeding apparatus as claimed in claim 15 and in which the bottom of at least said one pond funnels towards said exit, with the fish retaining means disposed within the funnel and providing at least peripheral openings for the passage to said exit of uneaten feed with said waste water.

17. Fish feeding apparatus as claimed in claim 16 and in which retaining means comprises fish-retaining screen means peripheral portions of which are spaced from the bottom walls sufficiently to pass the uneaten feed with the waste water.

18. Fish feeding apparatus as claimed in claim 16 and in which means is provided for lifting the retaining means in response to a rise in pond water level resulting from a choking at the said bottom, thereby to increase the said openings to relieve such choking and then to return the retaining means to its previous location.

19. Fish feeding apparatus as claimed in claim 16 and in which means is provided for varying said openings.

20. Fish feeding apparatus as claimed in claim 16 and in which said retaining means comprises ball means provided with spaced ridges for contacting the funneling bottom walls and defining said peripheral openings therebetween.

21. Fish feeding apparatus as claimed in claim 20 and in which said ball means is connected mechanically to float means upon the pond to enable bottom choking relief.

22. Fish feeding apparatus as claimed in claim 12 and in which light-blocking means is provided in at least one of said ponds with illuminated regions adjacent portions of the light-blocking means for exposing feed to fish resting in dark areas provided under the light-blocking means.

23. Fish feeding apparatus as claimed in claim 22 and in which means is provided operable beyond daylight hours for illuminating said illuminated regions and exposing feed including uneaten feed received from an adjacent pond.

24. Fish feeding apparatus as claimed in claim 22 and in which said light-blocking means comprises a light-blocking cover floating upon said pond.

25. Fish feeding apparatus as claimed in claim 22 and in which said light-blocking means comprises a cover submerged in the pond.

26. Fish feeding apparatus as claimed in claim 22 and in which said light-blocking means comprises a plurality of vertically spaced cover means disposed within the pond defining stacked rest areas at successive vertical sections of the pond.

27. Fish feeding apparatus for use with a plurality of successive fish ponds having fish-feed introducing means and inlet water means for supplying inlet water to the respective ponds and for circulating the feed about the same as the feed drops under gravity towards the bottom of the pond, said apparatus comprising downwardly sloping screen means of perforations small compared with the uneaten feed contained in the waste water at the bottom of the pond and positioned to receive and pass such waste water downwardly over the screen means such that the waste water traveling therealong drops through the said perforations while carrying the uneaten feed along the screen means beyond its bottom to the next pond, the length of the screen means being sufficient relative to the waste water flow rate to separate substantially all the waste water from the uneaten feed by the time such feed reaches the said bottom of the screen means.

28. Fish feeding apparatus as claimed in claim 27 and in which said downwardly sloping means is provided with upwardly extending side walls for laterally confining said waste water and uneaten feed traveling thereover.

29. Fish feeding apparatus as claimed in claim 27 and in which waste water outlet means is positioned underneath said screen means extending transversely of the same.

30. Fish feeding apparatus as claimed in claim 27 and in which water inlet means for the said next pond extends transversely along said bottom of the screen means to receive the separate uneaten feed and carry the same into said next pond.

* * * * *